(12) United States Patent
Beith et al.

(10) Patent No.: US 12,347,052 B2
(45) Date of Patent: Jul. 1, 2025

(54) VIRTUAL CONTENT GENERATION

(71) Applicant: QUALCOMM Incorporated, San Diego, CA (US)

(72) Inventors: Scott Beith, Carlsbad, CA (US); Jonathan Kies, Encinitas, CA (US); Robert Tartz, Imperial Beach, CA (US); Ananthapadmanabhan Arasanipalai Kandhadai, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/666,374

(22) Filed: May 16, 2024

(65) Prior Publication Data

US 2024/0386680 A1 Nov. 21, 2024

Related U.S. Application Data

(63) Continuation of application No. 18/155,609, filed on Jan. 17, 2023, now Pat. No. 12,020,390, which is a
(Continued)

(51) Int. Cl.
G06T 19/00 (2011.01)
G02B 27/01 (2006.01)
(Continued)

(52) U.S. Cl.
CPC ........ G06T 19/006 (2013.01); G02B 27/0172 (2013.01); G06F 3/011 (2013.01);
(Continued)

(58) Field of Classification Search
None
See application file for complete search history.

(56) References Cited

U.S. PATENT DOCUMENTS 8,928,589 B2 1/2015 Bi
9,384,594 B2 7/2016 Maciocci et al.
(Continued)

FOREIGN PATENT DOCUMENTS

CN 105975067 A 9/2016
CN 105980965 A 9/2016
(Continued)

OTHER PUBLICATIONS

Du H., et al., "A Virtual Keyboard Based on True-3D Optical Ranging", Jan. 2005, 11 Pages.
(Continued)

*Primary Examiner* — Martin Mushambo
(74) *Attorney, Agent, or Firm* — Polsinelli/Qualcomm

(57) ABSTRACT

Systems, apparatuses (or devices), methods, and computer-readable media are provided for generating virtual content. For example, a device (e.g., an extended reality device) can obtain an image of a scene of a real-world environment, wherein the real-world environment is viewable through a display of the extended reality device as virtual content is displayed by the display. The device can detect at least a part of a physical hand of a user in the image. The device can generate a virtual keyboard based on detecting at least the part of the physical hand. The device can determine a position for the virtual keyboard on the display of the extended reality device relative to at least the part of the physical hand. The device can display the virtual keyboard at the position on the display.

20 Claims, 6 Drawing Sheets

Related U.S. Application Data continuation of application No. 17/647,154, filed on Jan. 5, 2022, now Pat. No. 11,587,297, which is a continuation of application No. 17/010,237, filed on Sep. 2, 2020, now Pat. No. 11,270,515.

(60) Provisional application No. 62/895,970, filed on Sep. 4, 2019.

(51) Int. Cl.
  G06F 3/01 (2006.01)
  G06F 3/0487 (2013.01)

(52) U.S. Cl.
  CPC ............ G06F 3/017 (2013.01); G06F 3/0487 (2013.01); *G02B 2027/0138* (2013.01); *G06F 2203/04803* (2013.01)

(56) References Cited

U.S. PATENT DOCUMENTS

| | | | |
|---|---|---|---|
| 9,891,820 | B2 | 2/2018 | Luo |
| 9,927,869 | B2 | 3/2018 | Kwon et al. |
| 10,222,981 | B2 | 3/2019 | Bennet et al. |
| 11,270,515 | B2 | 3/2022 | Beith et al. |
| 11,587,297 | B2 | 2/2023 | Beith et al. |
| 2014/0266988 | A1 | 9/2014 | Fisher et al. |
| 2016/0085379 | A1 | 3/2016 | Cho et al. |
| 2016/0132111 | A1 | 5/2016 | Lowe et al. |
| 2016/0299569 | A1 | 10/2016 | Fisher et al. |
| 2017/0329515 | A1 | 11/2017 | Clement et al. |
| 2018/0350150 | A1* | 12/2018 | Powderly .............. G06T 19/006 |
| 2020/0401804 | A1 | 12/2020 | Grundhoefer et al. |
| 2021/0065455 | A1 | 3/2021 | Beith et al. |
| 2022/0130125 | A1 | 4/2022 | Beith et al. |
| 2023/0154125 | A1 | 5/2023 | Beith et al. |

FOREIGN PATENT DOCUMENTS

| | | |
|---|---|---|
| CN | 106537261 A | 3/2017 |
| CN | 107710009 A | 2/2018 |
| CN | 107743604 A | 2/2018 |
| CN | 107850936 A | 3/2018 |
| CN | 108334203 A | 7/2018 |
| CN | 109683667 A | 4/2019 |
| DE | 102020116144 A1 | 12/2020 |
| WO | 2018063759 A1 | 4/2018 |

OTHER PUBLICATIONS

International Preliminary Report on Patentability—PCT/US2020/049114 The International Bureau of WIPO—Geneva, Switzerland, Mar. 17, 2022.

International Search Report and Written Opinion—PCT/US2020/049114—ISA/EPO—Nov. 26, 2020.

\* cited by examiner

VIRTUAL CONTENT GENERATION

CROSS-REFERENCE TO RELATED APPLICATIONS

This application is a continuation of U.S. Non-Provisional application Ser. No. 18/155,609, filed Jan. 17, 2023, which is a continuation of U.S. Non-Provisional application Ser. No. 17/647,154, filed Jan. 5, 2022, which is a continuation of U.S. Non-Provisional application Ser. No. 17/010,237, filed Sep. 2, 2020, which claims the benefit of U.S. Provisional Application No. 62/895,970, filed Sep. 4, 2019, all of which are hereby incorporated by reference in their entirety and for all purposes.

TECHNICAL FIELD

The present disclosure generally relates to techniques and systems for generating and registering an extended reality keyboard (referred to as a "virtual keyboard") to one or more hands of a user.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Each of these forms of extended reality allows users to experience or interact with immersive virtual environments or content. For example, an extended reality experience can allow a user to interact with a real or physical environment enhanced or augmented with virtual content. Extended reality technologies can be implemented to enhance user experiences in a wide range of contexts, such as entertainment, healthcare, retail, education, social media, and so forth.

SUMMARY

In some examples, systems, methods, and computer-readable media are described for generating an extended reality keyboard, also referred to as a virtual keyboard. For instance, an extended reality device (e.g., an augmented reality head-mounted device, such as glasses or other head-mounted device) worn by a user can detect one or more hands of the user, such as by detecting the one or more hands in the field of view of a camera of the extended reality device, detecting the one or more hands using a sensor located near or on the hands, etc. The extended reality device can generate and display a virtual keyboard on a display of the extended reality device, such as in response to detecting the one or more hands in the camera field of view. In some examples, the virtual keyboard can be displayed over images of real-world content (e.g., a scene of a real-world environment can be viewed through the display of the extended reality device) or over virtual content. In some examples, the virtual keyboard can be displayed as a projection on the display of the extended reality device (e.g., in these examples, the display can include lenses of extended reality glasses), so the viewer can view and control the virtual keyboard while viewing the real-world through the display. From the viewer's perspective through the extended reality device, the virtual keyboard appears to be positioned in open space.

The extended reality device can register the virtual keyboard relative to the one or more hands of the user. For example, one or more landmark points on the one or more hands can be used as real-world registration points for positioning the virtual keyboard on the display of the extended reality device. In some implementations, the one or more landmark points can include at least one point on each hand of the user (e.g., a point on the palm of each hand) and at least one point on each finger of the hand (e.g., three points on each finger). As used herein, the term "finger" can refer to all five fingers of a hand, including a thumb.

In some examples, once a position is determined for the virtual keyboard based on being registered to the one or more hands of the user, the virtual keyboard can be maintained at the position so that it remains fixed at the position until a re-registration event is detected. Examples of re-registration events can include a location change of the one or more hands by a threshold change amount, a movement of the one or more hands by a threshold movement amount, an expiration of a predetermined amount of time after determining the position for the virtual keyboard on the display, any combination thereof, and/or other re-registration event.

In some examples, the virtual keyboard can be split into at least a first part and a second part. The first part can be registered relative to a first hand of the user and the second part can be registered relative to a second hand of the user. For instance, the first hand can be the user's left hand, and the first part of the virtual keyboard can include the left half (or other left-side portion) of the virtual keyboard, and the second hand can be the user's right hand, and the second part of the virtual keyboard can include the right half (or other right-side portion) of the virtual keyboard. In such examples, the first part of the virtual keyboard can track the first hand, and the second part of the virtual keyboard can track the second hand. For instance, as the first hand is moved by the user, the first part of the virtual keyboard can move on the display relative to the first hand. Similarly, the second part of the virtual keyboard can move on the display relative to the second hand.

According to at least one illustrative example, a method of generating virtual content is provided. The method includes: obtaining, by an extended reality device, an image of a scene of a real-world environment, wherein the real-world environment is viewable through a display of the extended reality device as virtual content is displayed by the display; detecting, by the extended reality device, at least a part of a physical hand of a user in the image; generating, based on detecting at least the part of the physical hand, a virtual keyboard; determining a position for the virtual keyboard on the display of the extended reality device, the position being determined relative to at least the part of the physical hand; and displaying, by the extended reality device, the virtual keyboard at the position on the display.

In another example, an apparatus for generating virtual content is provided that includes a display, a memory configured to store one or more images, and one or more processors (e.g., implemented in circuitry) and coupled to the memory. The one or more processors are configured to and can: obtain an image of a scene of a real-world environment, wherein the real-world environment is viewable through a display of the extended reality device as virtual content is displayed by the display; detect at least a part of a physical hand of a user in the image; generate, based on detecting at least the part of the physical hand, a virtual keyboard; determine a position for the virtual keyboard on the display, the position being determined relative to at least the part of the physical hand; and display the virtual keyboard at the position on the display.

In another example, a non-transitory computer-readable medium of an extended reality device having stored thereon instructions that, when executed by one or more processors, cause the one or more processors to: obtain an image of a scene of a real-world environment, wherein the real-world environment is viewable through a display of the extended reality device as virtual content is displayed by the display; detect at least a part of a physical hand of a user in the image; generate, based on detecting at least the part of the physical hand, a virtual keyboard; determine a position for the virtual keyboard on the display, the position being determined relative to at least the part of the physical hand; and display the virtual keyboard at the position on the display.

In another example, an apparatus for processing one or more frames is provided. The apparatus includes: means for obtaining an image of a scene; detect at least a part of a physical hand of a user in the image, at least the part of the physical hand being viewable through a display; generate, based on detecting at least the part of the physical hand, a virtual keyboard; determine a position for the virtual keyboard on the display, the position being determined relative to at least the part of the physical hand; and display the virtual keyboard at the position on the display over a real-world environment viewable through the display.

In some aspects, the method, apparatuses, and computer-readable medium described above further comprise: detecting one or more landmark points on the physical hand; determining one or more locations of the one or more landmark points with respect to a camera used to capture the image; and determining, based on the one or more locations of the one or more landmark points with respect to the camera, the position for the virtual keyboard on the display relative to the physical hand.

In some aspects, the method, apparatuses, and computer-readable medium described above further comprise: determining a pose of a head of the user; and determining, based on the pose of the head, the position for the virtual keyboard on the display relative to the head.

In some aspects, the virtual keyboard is fixed at the position on the display as the physical hand moves positions.

In some aspects, the method, apparatuses, and computer-readable medium described above further comprise: receiving input associated with operation of the virtual keyboard; and maintaining the virtual keyboard at the position as the virtual keyboard is operated based on the received input.

In some aspects, the method, apparatuses, and computer-readable medium described above further comprise: determining at least the part of the physical hand is in a different location in an additional image of the scene as compared to a location of at least the part of the physical hand in the image; and displaying, based on determining at least the part of the physical hand is in the different location in the additional image of the scene, the virtual keyboard at an additional position on the display, the additional position being different than the position.

In some aspects, the method, apparatuses, and computer-readable medium described above further comprise: detecting expiration of a predetermined amount of time after determining the position for the virtual keyboard on the display; and displaying, based on detecting expiration of the predetermined amount of time, the virtual keyboard at an additional position on the display, the additional position being different than the position.

In some aspects, at least the part of the physical hand includes at least one point on the physical hand and at least one point on a finger of the physical hand.

In some aspects, at least the part of the physical hand includes at least one point on the physical hand and at least one point on each finger of the physical hand.

In some aspects, the virtual keyboard includes a first part and a second part, the first part being displayed at the position on the display relative to the physical hand, and the second part being displayed at an additional position on the display relative to an additional physical hand of the user. In some examples, the first part of the virtual keyboard moves on the display relative to the physical hand, and wherein the second part of the virtual keyboard moves on the display relative to the additional physical hand.

In some aspects, the method, apparatuses, and computer-readable medium described above further comprise: determining the physical hand is not present in an additional image of the scene; and removing, based on determining the physical hand is not present in the additional image of the scene, the virtual keyboard from the display.

In some aspects, the virtual keyboard is active for providing input when the virtual keyboard is removed from the display.

In some aspects, the method, apparatuses, and computer-readable medium described above further comprise deactivating the virtual keyboard from being used for providing input.

In some aspects, the virtual keyboard is displayed when the physical hand is not present in one or more images of the scene.

In some aspects, the apparatus is or is part of a camera (e.g., an IP camera), a mobile device (e.g., a mobile telephone or so-called "smartphone," or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
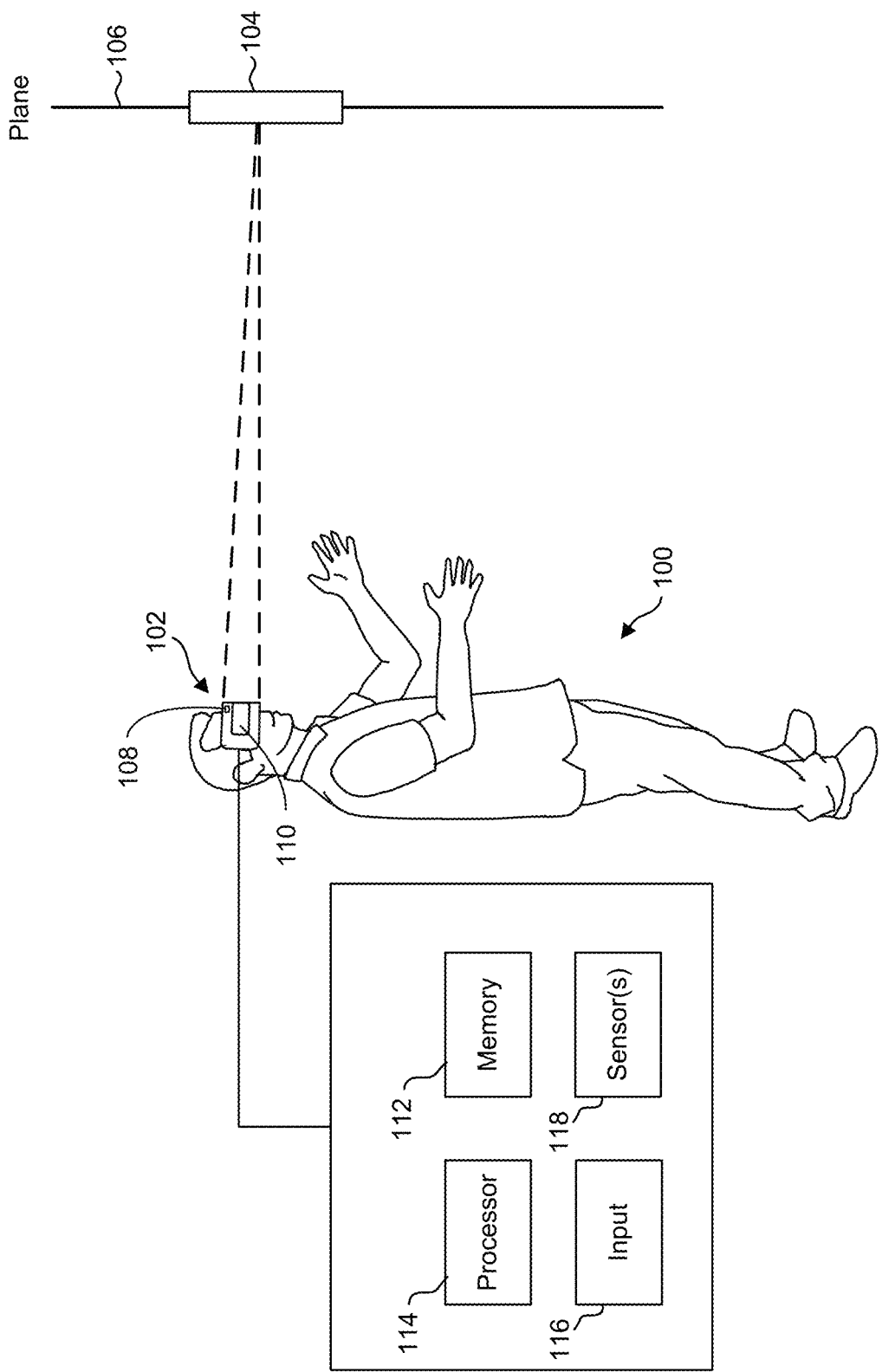
FIG. 1 is a diagram illustrating an example of an extended reality device worn by a user, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously described, extended reality (XR) technologies can provide virtual content to a user, and/or combine real or physical environments and virtual environments (made up of virtual content) to provide users with extended reality experiences. Extended reality experiences include virtual reality (VR), augmented reality (AR), mixed reality (MR), and/or other immersive content.

AR is a technology that provides virtual or computer-generated content (referred to as AR content) over the user's view of a physical, real-world scene or environment. AR content can include any virtual content, such as video, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving object through an AR device display, but the user's visual perception of the real object may be augmented or enhanced by a virtual image of that object (e.g., a real-world car replaced by a virtual image of a DeLorean) or by AR content added to the object (e.g., virtual wings added to a live animal). Various types of AR systems can be used for gaming, entertainment, and/or other applications.

Two types of AR systems that can be used to provide AR content include video see-through displays and optical see-through displays, which can both be used to enhance a user's visual perception of real-world objects. In a video see-through system, a live video of a real-world scenario is displayed, including one or more objects augmented or enhanced on the live video. A video see-through system can be implemented using a mobile device (e.g., video on a mobile phone display), a head-mounted display (HMD), or other suitable device that can display video and computer-generated objects over the video.

In an optical see-through system with AR features, AR objects can be displayed directly onto the real-world view without a video. For example, the user may view physical objects through a display (e.g., glasses or lenses), and AR content can be projected onto the display to allow the user to obtain enhanced visual perception of one or more real-world objects. Examples of displays used in an optical see-through AR system are AR glasses, a head-mounted display (HMD), another AR headset, or other similar device that can include a lens or glass in front of each eye to allow the user to see a real-world object directly, while also allowing an enhanced image of that object or additional AR content to be projected onto the glass to augment the user's visual perception of the real-world.

VR provides a complete immersive experience in a three-dimensional computer-generated environment or video of a real-world environment that can be interacted with in a seemingly real or physical way. As a user experiencing a VR environment moves in the real world, images rendered in the virtual environment also change, giving the user the perception that the user is moving within the VR environment. For example, a user can turn left or right, look up or down, and/or move forwards or backwards, thus changing the user's point of view of the VR environment. The VR content presented to the user can change accordingly, so that the user's experience is as seamless as in the real world. VR content can include VR video in some cases, which can be captured and rendered at very high quality, potentially providing a truly immersive virtual reality experience. Virtual reality applications include gaming, training, education, sports video, and online shopping, among others. VR content can be rendered and displayed using VR equipment, such as a VR HMD or other VR headset, which fully covers a user's eyes during a VR experience.

MR technologies can combine aspects of VR and AR to provide an immersive experience for a user. For example, in an MR environment, real-world and computer-generated objects can interact (e.g., a real person can interact with a virtual person as if the virtual person were a real person).

Text and character entry is a foundational feature for many communication devices, including AR, VR, and MR systems. For example, AR devices now and in the future will need to support text entry via some input device. Many text entry solutions use a type of physical input device, such and a keyboard, a pen or other pointer device, or other input device. Gesture and voice are also examples of input mechanisms, but are not widely used due to, for example, social acceptance of using such input mechanisms.

Use of a keyboard for text and character entry is well known to most users. However, a physical keyboard cannot be used with many XR (e.g., AR, VR, and/or MR) systems in a user-friendly manner. In some cases, XR systems are oftentimes mobile and used as a user travels from one place to another. In some cases, the user cannot see a physical keyboard when wearing an XR headset. Further, in some cases, an XR device may not have an input that can allow connection of a physical keyboard. For instance, a set of AR glasses may not have a Universal Serial Bus (USB) port that can accept a keyboard cable or Bluetooth™ dongle.

A virtual keyboard (e.g., an AR keyboard) can be beneficial in an XR system, by allowing a user to readily provide text or character input without the need for a physical keyboard. However, there are technical challenges associated with developing a virtual keyboard. A virtual keyboard should closely match the usability standards of a real world keyboard to be effective and gain user acceptance. For example, the keyboard should not suffer from excessive jitter or drift, so that a user can precisely select the buttons on the keyboard (to reduce errors). To prevent such jitter in AR-based and some MR-based systems that allow a user to view the real world augmented with virtual content, the virtual keyboard needs to be registered to (e.g., positioned relative to) one or more physical objects in the real world. However, in some instances, there can be a lack of real-world objects available for providing a reference for registration purposes. Such problems also exist for other virtual objects, such as virtual musical instruments, virtual push buttons, virtual sliders, a virtual steering wheel, a virtual paint brush, a virtual writing instrument, and/or other virtual objects.

Systems, apparatuses, methods, and computer-readable media are described herein for generating a virtual object (e.g., a virtual keyboard) and registering the virtual object relative to one or more hands of a user. Examples are provided herein using a virtual keyboard as an example of a virtual object. However, the techniques described herein can be implemented for registering other virtual objects relative to one or more hands of a user, including virtual musical instruments (e.g., a virtual piano or keyboard, virtual drums, virtual bongos, etc.), virtual push buttons, virtual sliders, a virtual steering wheel, a virtual paint brush, a virtual writing instrument (e.g., a virtual pencil, a virtual pen, etc.), and/or other virtual objects. Examples are also provided herein using an optical see-through AR system for illustrative purposes. However, one of ordinary skill will appreciate that the techniques described herein can apply to a video see-through AR system or other types of XR systems, including VR and MR systems.

FIG. 1 is a diagram illustrating an example of an AR device 102 being worn by a user 100. While the AR device 102 is shown in FIG. 1 as an HMD, the AR device 102 can include any suitable type of AR device, such as AR glasses or other AR devices. The AR device 102 is described as an optical see-through AR device, which allows the user 100 to view the real world through a display 110 of the AR device 102 while wearing the AR device 102. For example, the user 100 can view an object 104 in a real-world scene or environment on a target plane 106 at a distance from the user 100. The AR device 102 has a camera 108 and a display 110 (e.g., a glass, a screen, a lens, or other display) that allows a user to see the real-world scene or environment and also that allows AR content to be displayed thereon. While one camera 108 and one display 110 are shown in FIG. 1, the AR device 102 can include multiple cameras and/or multiple displays (e.g., a display for the right eye and a display for the left eye) in some implementations. AR content (e.g., an image, a video, a graphic, a virtual or AR object, or other AR content) can be projected or otherwise displayed on the display 110. In one example, the AR content can include an augmented version of the object 104. In another example, the AR content can include additional AR content that is related to the object 104 or related to one or more other objects in the real-world scene or environment.

As shown in FIG. 1, the AR device 102 can include or be in wired or wireless communication with a processor 114 and a memory 112 (or other a computer-readable medium). While one processor 114 and one memory 112 are shown in FIG. 1, the AR device 102 can include multiple processors and/or multiple memory devices in some implementations. The processor 114 and the memory 112 can store and execute instructions used to perform the techniques described herein. In implementations where the AR device 102 is in communication (wired or wirelessly) with the memory 112 and the processor 114, a device housing the memory 112 and the processor 114 may be a computing device, such as a desktop computer, a laptop computer, a mobile phone, a tablet, a game console, or other suitable device. The AR device 102 also includes or is in communication with (wired or wirelessly) an input device 116. The input device 116 can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the camera 108 can capture images that can be processed for interpreting gesture commands.

The camera 108 can capture color images (e.g., images having red-green-blue (RGB) color components, images having luma (Y) and chroma (C) color components such as YCbCr images, or other color images) and/or grayscale images. As noted above, in some cases, the AR device 102 can include multiple cameras, such as dual front cameras and/or one or more front and one or more rear-facing cameras, which may also incorporate various sensors (e.g., one or more sensors 118). In some cases, camera 108 (and/or other cameras of the AR device 102) can capture still images and/or videos that include multiple video frames (or images). In some cases, image data received by an image sensor of the camera 108 (and/or other cameras) can be in a raw uncompressed format, and may be compressed and/or otherwise processed (e.g., by an image signal processor (ISP) or other processor of the AR device 102) prior to being further processed and/or stored in the memory 112. In some cases, image compression may be performed by the processor 114 using lossless or lossy compression techniques (e.g., any suitable video or image compression technique).

In some cases, the camera 108 (and/or other camera of the AR device 102) can be configured to also capture depth information. For example, in some implementations, the camera 108 (and/or other camera) can include an RGB-depth (RGB-D) camera. In some cases, the AR device 102 can include one or more depth sensors (not shown) that are separate from the camera 108 (and/or other camera) and that can capture depth information. For instance, such a depth sensor can obtain depth information independently from the camera 108. In some examples, a depth sensor can be physically installed in a same general location the camera 108, but may operate at a different frequency or frame rate from the camera 108. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

In some implementations, the AR device 102 includes one or more sensors 118. The one or more sensors 118 can include one or more accelerometers, one or more gyroscopes, one or more magnetometers, a combination thereof, and/or other sensors. The one or more sensors 118 can provide velocity, orientation, and/or other position-related information to the processor 114. In some cases, the one or more sensors 118 can include at least one inertial measurement unit (IMU). An IMU is an electronic device that measures the specific force, angular rate, and/or the orientation of the AR device 102, using a combination of one or more accelerometers, one or more gyroscopes, and/or one or more magnetometers. In some examples, the one or more sensors 118 can output measured information associated with the capture of an image captured by the camera 108 (and/or other camera of the AR device 102) and/or depth information obtained using one or more depth sensors of the AR device 102.

The output of one or more sensors 118 (e.g., one or more IMUs) can be used by the processor 114 to determine a pose of the AR device 102 (also referred to as the head pose) and/or the pose of the camera 108 (or other camera of the AR device 102). In some cases, the pose of the AR device 102 and the pose of the camera 108 (or other camera) can be the same. The pose of camera 108 refers to the position and orientation of the camera 108 relative to a frame of reference (e.g., with respect to the object 104). In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some embodiments, the pose of camera 108 and/or the AR device 102 can be determined and/or tracked by the processor 114 using a visual tracking solution based on images captured by the camera 108 (and/or other camera of the AR device 102). In some examples, the processor 114 can perform tracking using computer vision-based tracking, model-based tracking, and/or simultaneous localization and mapping (SLAM) techniques. For instance, the processor 114 can perform SLAM or can be in communication (wired or wireless) with a SLAM engine (now shown). SLAM refers to a class of techniques where a map of an environment (e.g., a map of an environment being modeled by AR device 102) is created while simultaneously tracking the pose of a camera (e.g., camera 108) and/or the AR device 102 relative to that map. The map can be referred to as a SLAM map, and can be three-dimensional (3D). The SLAM techniques can be performed using color or grayscale image data captured by the camera 108 (and/or other camera of the AR device 102), and can be used to generate estimates of 6DOF pose measurements of the camera 108 and/or the AR device 102. Such a SLAM technique configured to perform 6DOF tracking can be referred to as 6DOF SLAM. In some cases, the output of the one or more sensors 118 can be used to estimate, correct, and/or otherwise adjust the estimated pose.

In some cases, the 6DOF SLAM (e.g., 6DOF tracking) can associate features observed from certain input images from the camera 108 (and/or other camera) to the SLAM map. 6DOF SLAM can use feature point associations from an input image to determine the pose (position and orientation) of the camera 108 and/or AR device 102 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the camera 108 and/or the AR device 102 can be determined by projecting features from the 3D SLAM map into an image or video frame and updating the camera pose from verified 2D-3D correspondences.

In one illustrative example, the processor 114 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The features points in key frames either match (are the same or correspond to) or fail to match the features points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some examples, AR (or virtual) objects can be registered to (e.g., positioned relative to) the detected features points in a scene. For example, the user 100 can be looking at a restaurant across the street from where the user 100 is standing. In response to identifying the restaurant and AR content associated with the restaurant, the processor 114 can generate an AR object that provides information related to the restaurant. The processor 114 can also detect feature points from a portion of an image that includes a sign on the restaurant, and can register the AR object to the feature points of the sign so that the AR object is displayed relative to the sign (e.g., above the sign so that it is easily identifiable by the user 100 as relating to that restaurant).

The AR device 102 can generate and display various AR objects for viewing by the user 100. For example, the AR device 102 can generate and display a virtual keyboard as an AR object for the user 100 to enter text and/or other characters as needed. As noted above, a virtual keyboard should be as stable as possible so that the user can accurately provide input. The virtual keyboard needs to be registered to one or more physical objects in the real world. However, in many cases, there can be a lack of real-world objects with distinctive features that can be used as reference for registration purposes. For example, if a user is staring at a blank whiteboard, the whiteboard may not have any distinctive features to which the virtual keyboard can be registered. Outdoor environments provide even less distinctive points that can be used for registering a virtual keyboard, for example based on the lack of points in the real world, distinctive objects being further away in the real world than when a user is indoors, the existence of many moving points in the real world, points at a distance, among others.

To avoid at least the problem of a lack of feature points in a real-world scene or environment, the AR device 102 can make use of the hands of the user 100 for registering a virtual keyboard. For example, one or more hands and fingers of the user 100 can be used as the real world registration points for the virtual keyboard (e.g., to anchor the virtual keyboard in space). By registering the keyboard to the hands and fingers the challenge of operating outdoors is reduced.

Figure 2:
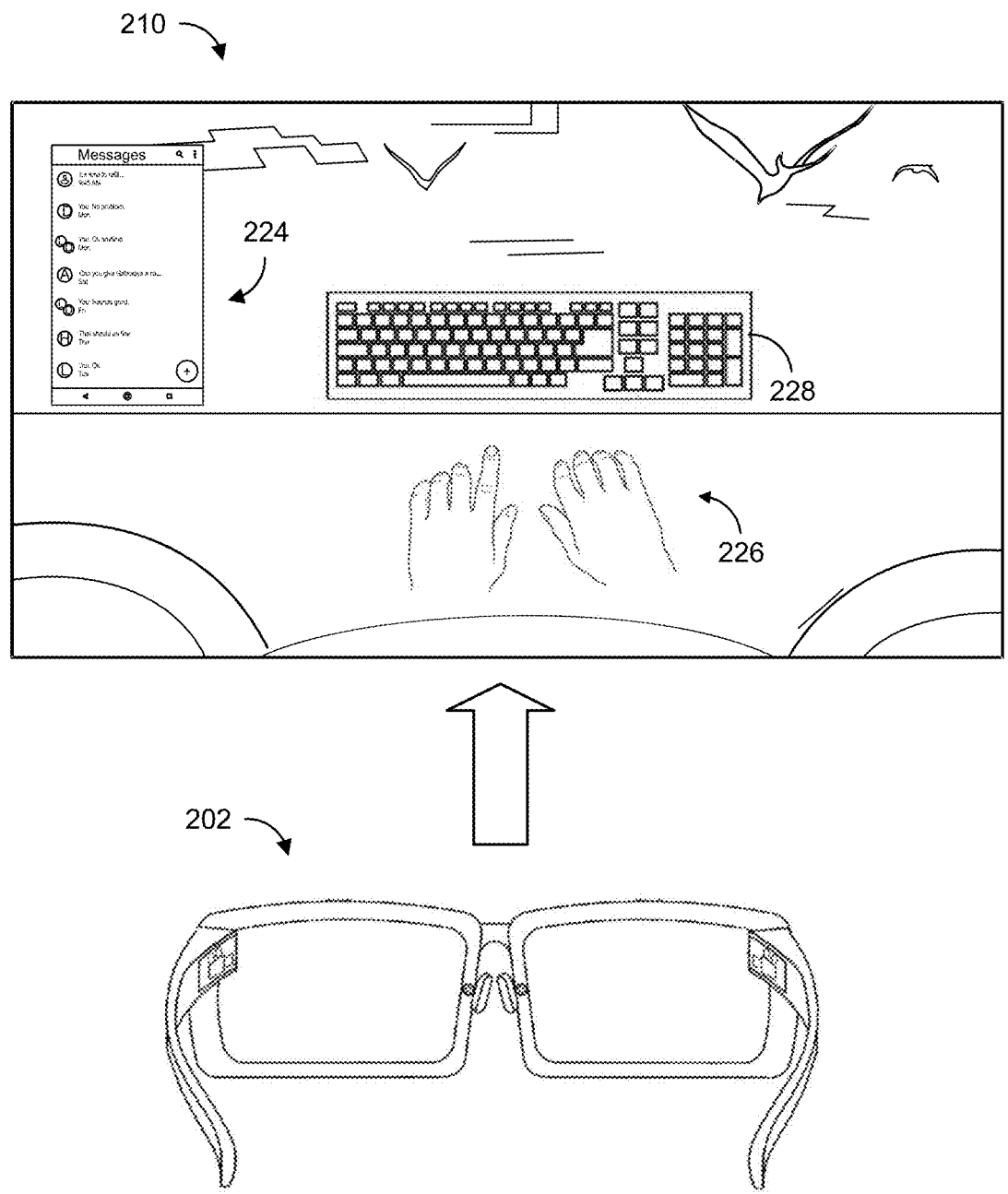
FIG. 2 is a diagram illustrating an example of a virtual keyboard being displayed by an extended reality device, in accordance with some examples.

FIG. 2 is a diagram illustrating an example of an AR device 202 displaying a virtual keyboard 228 on a display 210 (e.g., a piece of glass or a lens positioned over the user's eye). The virtual keyboard 228 is displayed as an AR object augmenting a user's view of a real-world scene or environment. As shown, the user can view the actual real-world environment, including their actual (or physical) hands 226 in the real-world environment, through the display 210 of the AR device 202. The AR device 202 can be similar to and can perform the same functions as the AR device 102 described above with respect to FIG. 1. As noted above, the aspects described below can also apply to other types of XR devices, such as VR devices and/or MR devices.

In some examples the virtual keyboard 228 can be generated and displayed in response to detecting the hands 226 of the user in the field of view of a camera of the AR device 202 (e.g., camera 108 shown in FIG. 1 or other camera). For instance, a processor of the AR device 202 (e.g., processor 114 shown in FIG. 1 or other component) can detect the actual (or physical) hands 226 of the user in an image captured by the camera of the AR device 202. In some cases, one hand or part of one hand can be detected in the image, which can cause the virtual keyboard 228 to be displayed. The hands 226 can be detected in one or more images using any suitable object detection technique. In one illustrative example, computer vision-based object detection can be used by the processor to detect the hands 226 (or one hand) in the image. Object detection in general is a technology used to detect (or locate) objects from an image or video frame. When localization is performed, detected objects can be represented using bounding regions that identify the location and/or approximate boundaries of the object (e.g., a face) in the image or video frame. A bounding region of a detected object can include a bounding box, a bounding circle, a bounding ellipse, or any other suitably-shaped region representing a detected object.

Different types of computer vision-based object detection algorithms can be used by the processor. In one illustrative example, a template matching-based technique can be used to detect one or more hands in an image. Various types of template matching algorithms can be used. One example of a template matching algorithm can perform Haar or Haar-like feature extraction, integral image generation, Adaboost training, and cascaded classifiers. Such an object detection technique performs detection by applying a sliding window (e.g., having a rectangular, circular, triangular, or other shape) across an image. An integral image may be computed to be an image representation evaluating particular regional features, for example rectangular or circular features, from an image. For each current window, the Haar features of the current window can be computed from the integral image noted above, which can be computed before computing the Haar features.

The Harr features can be computed by calculating sums of image pixels within particular feature regions of the object image, such as those of the integral image. In faces, for example, a region with an eye is typically darker than a region with a nose bridge or checks. The Haar features can be selected by a learning algorithm (e.g., an Adaboost learning algorithm) that selects the best features and/or trains classifiers that use them, and can be used to classify a window as a hand (or other object) window or a non-hand window effectively with a cascaded classifier. A cascaded classifier includes multiple classifiers combined in a cascade, which allows background regions of the image to be quickly discarded while performing more computation on object-like regions. For example, the cascaded classifier can classify a current window into a hand category or a non-hand category. If one classifier classifies a window as a non-hand category, the window is discarded. Otherwise, if one classifier classifies a window as a hand category, a next classifier in the cascaded arrangement will be used to test again. Until all the classifiers determine the current window is a hand (or other object), the window will be labeled as a candidate for being a hand (or other object). After all the windows are detected, a non-max suppression algorithm can be used to group the face windows around each hand to generate the final result of one or more detected hands.

In another example, machine learning techniques can be used to detect the hands 226 (or one hand) in the image. For example, a neural network (e.g., a convolutional neural network) can be trained, using labeled training data, to detect one or more hands in an image. In response to detecting the hands 226 (or one hand), the processor of the AR device 202 can generate the virtual keyboard 228 for display. In some examples, the processor of the AR device 202 can remove the virtual keyboard 228 from display if the hands 226 are no longer detected in an image or in a certain number of images (e.g., 1800 images, corresponding to one minute at a 30 frame per second capture rate, or other number of images) captured by the camera of the AR device 202. In some examples, the processor of the AR device 202 can remove the virtual keyboard 228 from display if the hands 226 are no longer detected in one or more image for a certain duration of time (e.g., for one minute, three minutes, five minutes, or other amount of time). In some examples, the process of the AR device 220 can deactivate the virtual keyboard 228 when the virtual keyboard 228 is removed from display.

In some examples, the processor of the AR device 220 can maintain the virtual keyboard 228 as active for providing input (e.g., based on receiving input from a user) after the virtual keyboard is removed from display. For example, if a user looks away from their hands 226 (and away from the virtual keyboard 228 registered relative to the hands 226), the virtual keyboard 228 can remain active and the user can continue to type or otherwise provide input using the virtual keyboard 228. In some examples, the process of the AR device 220 can deactivate the virtual keyboard 228 so that the virtual keyboard 228 cannot be used to provide input to the AR device 220 and/or other device in communication with the AR device 220. For instance, a user can select an option (e.g., by providing user input, such as gesture input, voice input, and/or other input) to deactivate the virtual keyboard 228.

In some examples, the processor of the AR device 220 can continue to display the virtual keyboard 228 even if the hands 226 are no longer detected in one or more images. For instance, in some cases, the processor can display the virtual keyboard 228 in a particular or pre-defined location on the display when the hands 226 are not detected in one or more images, such as in the bottom-center of the display, the bottom-left of the display, the bottom-right of the display, the top-left of the display, the top-right of the display, or other portion of the display. In some cases, the particular or pre-defined location can be configured or set by the user (e.g., as a user preference).

In some examples, a pose of the hands 226 can be determined using one or more sensors located on or near one or more of the hands 226. In one example, at least one sensor can be part of a glove on the right hand of the user and at least one other sensor can be part of a glove on the left hand of the user. In another example, at least one sensor can be part of a wrist band, a watch, or other item on the right wrist of the user, and at least one other sensor can be part of a wrist band, a watch, or other item on the right wrist of the user. The one or more sensors can detect the pose of the hand and can communicate information for the pose (e.g., the X, Y, and Z coordinates and/or the roll, pitch, and yaw) to the AR device 202. The AR device 202 can then displayed relative to the hands of the user (as described herein) as specified by the hand pose information.

As shown in FIG. 2, the virtual keyboard 228 is displayed as a projection at a position on the display 210 relative to the physical hands 226 of the user. The position at which the virtual keyboard 228 is displayed relative to the hands 226 can be determined by registering the virtual keyboard 228 to one or more landmark points detected on the hands 226, as described in more detail below. The user can continue to view the real-world scene (or environment) through the display 210 while the virtual keyboard 228 is displayed. The user can view and control the virtual keyboard 228 while being able to view the real-world scene. In some examples (not shown), the AR device 202 is configured to display the virtual keyboard as an overlay over images of the real-world scene or over images of a virtual environment that is displayed by the AR device 202.

In some examples, one or more AR objects can be displayed on the display 210 of the AR device 202, and the user can input text and/or other characters that can be used to manipulate the one or more AR objects. For instance, as shown in FIG. 2, an AR object 224 can be displayed on the display 210. The virtual keyboard 228 can receive input from the user in response to the user typing text and/or other characters on the virtual keyboard 228. The input can be processed and displayed in the AR object 224. In one illustrative example, the AR object 224 includes a texting application, and the user can input a message using the virtual keyboard 228, which can be displayed as a message in a field of the AR object 224.

Before displaying the virtual keyboard 228 (or while displaying the virtual keyboard 228 in some cases), the processor of the AR device 202 can register the virtual keyboard 228 to one or more landmark points (also referred to as registration points) detected on the hands 226. In some examples, the landmark points on the hands can be detected using hand skeletal tracking methods. For example, the detection can be performed using a depth camera view (e.g., an image from a depth camera, such as a depth sensor or an RGB-D camera) of the user's hands 226, an RGB monocular camera view (e.g., an image from an RGB monocular camera) of the hands 226, and/or a monochromatic camera view (e.g., an image from a monochromatic camera) of the hands 226. In one illustrative example, a 3-dimensional (3D) deformable model of a hand (or both hands 226) is used to generate a view of the hand that most closely matches the view of the hand as seen by the image sensor (e.g., the depth camera, the RGB camera, and/or the monochromatic camera). For instance, the 3D deformable model can be modified and used to generate a view that matches the view of the hand (or hands 226) in the image captured using the image sensor. Once the closely matching view of the 3D model of the hand is established, the parameters of the model corresponding to this matching view can be used to obtain the location of landmark points of the model, which is used to approximate the landmark points of the hand.

In other examples, templates of various hand poses, and their corresponding landmark points can be stored in a database apriori. At the time of detection, images captured by an image sensor (e.g., an RGB camera, a depth camera, a monochromatic camera, or other image sensor) are matched against one of the templates, and the corresponding matching template is used to locate the landmark points. The template and the matching may be stored in a feature space that is either hand-crafted or is learned using machine learning techniques.

As a result of the detection of the one or more landmark points on the hands 226, the pose of the landmarks (and thus the hands and fingers) in relative physical position with respect to the image sensors is established. As described in more detail below, the one or more landmark points on the hands 226 can be used as real-world registration points for positioning the virtual keyboard 228 on the display 210 of the AR device 202. While examples provided below describe using one or more landmark points on the hands 226 for registration of the virtual keyboard 228, the registration can be performed in some cases using landmark points of only one hand of the user. In some examples, different parts of the virtual keyboard can be registered with respect to different hands of the user (e.g., a first part can be registered with respect to a first hand, and a second part can be registered with respect to a second hand, as described below with respect to FIG. 4).

In some cases, the one or more landmark points can include at least one point on each hand of the user (e.g., a point on the palm of each hand) and at least one point on each finger of the hand (e.g., three points on each finger). As used herein, the term "finger" can refer to all five digits of a hand, including the index finger, the middle finger, the ring finger, the baby finger (or pinky), and the thumb. The landmark points on the different parts of the hand can provide multiple degrees of freedom, which can provide many options for positioning the virtual keyboard 228.

Figure 3:
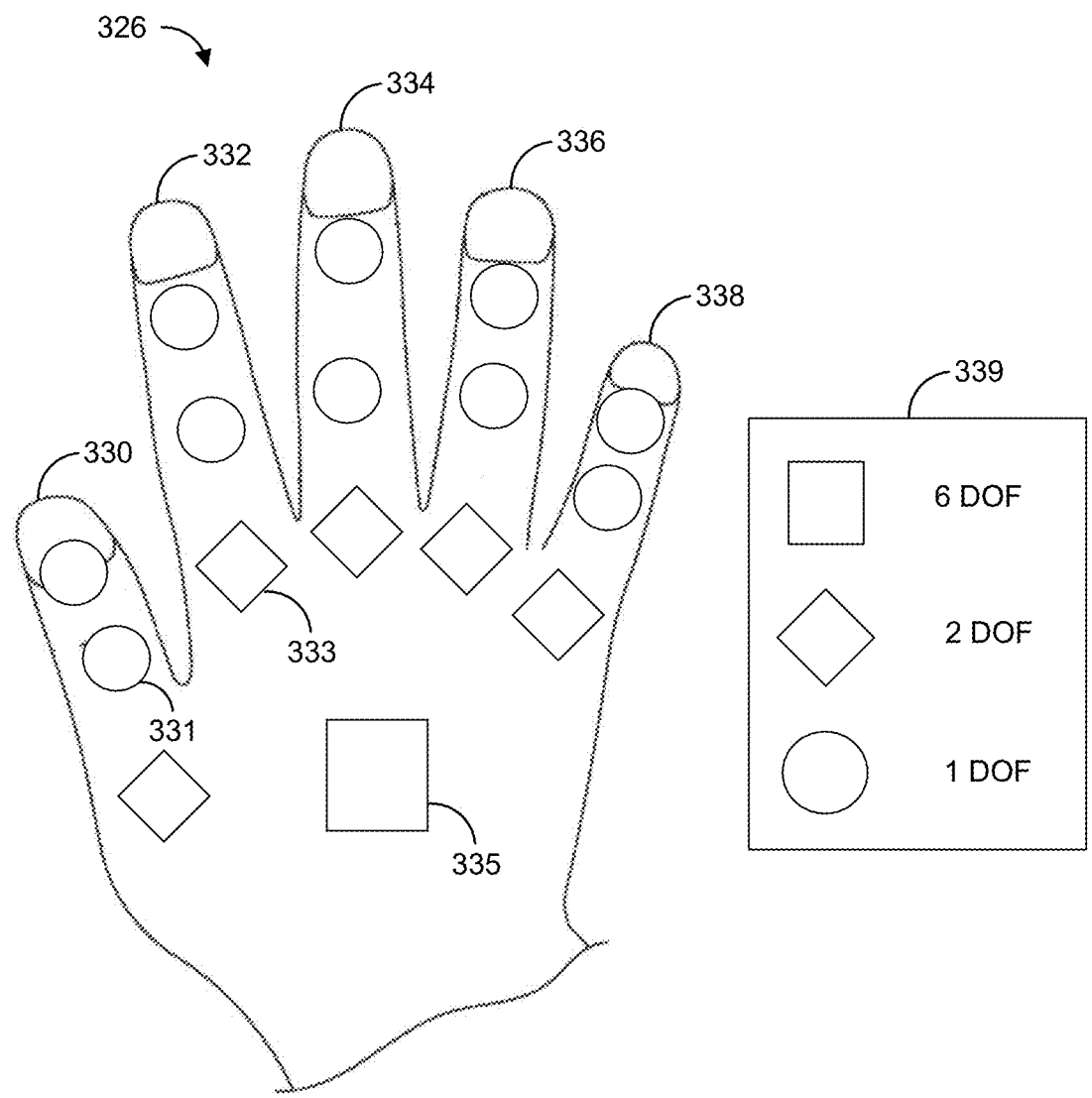
FIG. 3 is a diagram illustrating an example of landmark points of a hand that can be used for registering a position of a virtual keyboard and/or tracking positions of the virtual keyboard in one or more images, in accordance with some examples.

FIG. 3 is a diagram illustrating an example of landmark points of a hand 326 that can be used as real-world points for registering a position of the virtual keyboard 228 of FIG. 2 and/or tracking positions of the virtual keyboard 228 in one or more images. The landmark points shown in FIG. 3 correspond to different parts of the hand 326, including a landmark point 335 on the palm of the hand, three landmark points on the thumb 330 of the hand 326, three landmark points on the index finger 332 of the hand 326, three landmark points on the middle finger 334 of the hand 326, three landmark points on the ring finger 336 of the hand 326, and three landmark points on the pinky 338 of the hand 326. The palm of the hand 326 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6DOF) that can be used for registration and/or tracking. The 6DOF movement of the palm is illustrated as a square in FIG. 3, as indicated in the legend 339.

The different joints of the fingers of the hand 326 allow for different degrees of movement, as illustrated in the legend 339. As illustrated by the diamond shapes (e.g., diamond 333) in FIG. 3, the base of each finger (corresponding to the metacarpophalangeal joint (MCP) between the proximal phalanx and the metacarpal) has two degrees of freedom (2DOF) corresponding to flexion and extension as well as abduction and adduction. As illustrated by the circle shapes (e.g., circle 331) in FIG. 3, each of the upper joints of each finger (corresponding to the interphalangeal joints between the distal, middle, and proximal phalanges) has one degree of freedom (2DOF) corresponding flexion and extension. As a result, the hand 326 provides 26 degrees of freedom (26DOF) from which to register and track the virtual keyboard 228.

Referring back to FIG. 2, the processor of the AR device 202 can use one or more of the landmark points on the hands 226 to register the virtual keyboard. As noted above, as a result of the detection of the one or more landmark points on the hands 226, the pose of the landmarks (and thus the hands and fingers) in relative physical position with respect to the image sensors is established. For example, the landmark points on the palms of the hands 226 (e.g., the landmark point 335 in FIG. 3) can be detected in an image, and the locations of the landmark points can be determined with respect to the camera of the AR device 202. One or more points of the virtual keyboard 228 (e.g., a center point, such as a center of mass or other center point) can then be positioned on the display 210 of the AR device 202 relative to the locations determined for the landmark points on the palms of the hand 226. In some examples, the one or more points of the virtual keyboard 228 (e.g., the center point) can be registered relative to locations of multiple landmark points on the hands 226. In some examples, multiple points on the virtual keyboard 228 can be registered with respect to locations of one or multiple landmark points on the hands 226. For instance, center point of the virtual keyboard 228 and the points corresponding to the four corners of the virtual keyboard 228 can be registered with respect to locations of one or multiple landmark points on the hands 226.

In some examples, the processor of the AR device 202 can register the virtual keyboard to points in the real world environment (as detected in one or more images) and/or to other parts of the user. For instance, in some implementations, one or more image sensors (e.g., cameras) can be rigidly mounted on the AR device (e.g., an HMD, AR glasses, VR glasses, or other device). In such implementations, in addition to physical pose of the one or more hands with respect to the image sensors on the AR device, the locations of other fixed environmental landmarks such as distinctive points (referred to as key points) on walls, one or more corners of objects, features on a floor, among others could be determined. The virtual keyboard can be placed such that it is not always moving with the hands, but is limited to be within a certain position with respect to the stationary environmental key points.

In some examples, the pose of the head (or "head pose") of the user can be determined. The pose of the head can correspond to the position (e.g., with respect to a horizontal or X-dimension, a vertical or Y-dimension, and a depth or Z-dimension) and/or orientation (e.g., with respect to a roll, pitch, and yaw) of the head. The head pose can be determined using any suitable technique, such as using techniques described above with respect to FIG. 1 (e.g., using the one or more sensors 118, such as one or more accelerometers, one or more gyroscopes, one or more magnetometers, one or more inertial measurement units (IMUs), a combination thereof, and/or other sensors). The head pose (e.g., in addition to the hands 226) can be used to determine a position of the virtual keyboard 228. For example, the head pose can be used as another reference point from which to register the virtual keyboard 228.

In some examples, the head pose of the user can be used to determine whether to display the virtual keyboard 228 on the display 210. For instance, in addition to detecting the hands 226, the processor can also determine the head pose of the user as described above (e.g., using the one or more sensors 118, such as one or more accelerometers, one or more gyroscopes, one or more magnetometers, one or more inertial measurement units (IMUs), a combination thereof, and/or other sensors). The processor can determine whether to display the virtual keyboard 228 based on a combination of the head pose and hand position. In one illustrative example, if the hands 226 are detected as being spread apart by a certain amount (e.g., by twelve inches or more) and the pose of the head is such that it is tilted backwards, it can be determined that the user is not attempting to type a message (e.g., the user may be tilting her head backwards and holding her hands apart in frustration), and the processor can determine not to display the virtual keyboard 228.

In some examples, the virtual keyboard 228 can be maintained at the position determined using the locations of the landmark points of the hands 226 (and in some cases using points in the real-world scene or environment). The user can then virtually type on the virtual keyboard 228 as the virtual keyboard 228 stays fixed at the determined position. The virtual keyboard 228 can stay fixed as the user types. In some cases, the virtual keyboard 228 can be maintained at the determined position until a re-registration event is detected by the processor of the AR device 202. If a re-registration event is detected, the processor can re-register the virtual keyboard 228 relative to the hands 226, so that the virtual keyboard 228 is displayed at a new position on the display 210. In one illustrative example, a re-registration event can include a location change of the one or more of the hands 226 by a threshold change amount. For instance, if the user moves the hands 226 by more than the threshold change amount, the processor of the AR device 202 can re-register the virtual keyboard 228 using the one or more landmark points of the hands 226. The threshold change amount can include any suitable distance, such as six inches, twelve inches, eighteen inches, or other suitable amount.

In another illustrative example, a re-registration event can include a movement of the one or more of the hands 226 by a threshold movement amount. For instance, the speed and/or acceleration of a hand can be measured (e.g., using an accelerometer, gyroscope, and/or other sensor), and can be used to determine if the speed and/or acceleration exceeds the threshold movement amount. If the processor of the AR device 202 detects movement of one or more of the hands 226 at a speed and/or acceleration that exceeds the threshold movement amount, the processor can re-register the virtual keyboard 228 using the one or more landmark points of the hands 226. The threshold movement amount can include any suitable speed and/or acceleration, such as two feet per second, that indicates the hands 226 may have moved to a new position.

In another illustrative example, a re-registration event can include a predetermined amount of time after determining a position for the virtual keyboard 228 on the display 210. For example, if the processor of the AR device 202 detects expiration of the predetermined amount since a previous position of the virtual keyboard 228 was determined (e.g., since the virtual keyboard 228 was last registered to the hands 226 of the user), the processor can re-register the virtual keyboard 228 using the one or more landmark points of the hands 226. The predetermined amount of time can include any suitable amount of time, such as every fifteen seconds, thirty seconds, one minute, two minutes, five minutes, or other amount of time.

In some examples, an initial position of the virtual keyboard 228 can be determine using the locations of the landmark points of the hands 226 (and in some cases using points in the real-world scene or environment). In some cases, after the initial position of the virtual keyboard 228 is determined, the virtual keyboard 228 can move as the hands 226 of the user move. In some examples, the virtual keyboard 228 can maintain a same location or position relative to the fingertip location(s) as the hands 226 move. The virtual keyboard 228 may not move if the fingertips are within a threshold distance (e.g., 0.5 inch, 1 inch, 2 inches, and/or other distance) of selecting nearby keys. For instance, the virtual keyboard 228 can remain stationary when the fingertips are within the threshold distance of selecting nearby keys.

In some examples, the virtual keyboard 228 can be virtually positioned such that it is always at a pre-determined angle with respect to the hands 226 using the pose of the hands 226. In such examples, as the hands 226 and/or the fingers of the hands 226 move in space, the virtual keyboard will move along with the hands 226, but will stay positioned at the pre-determined angle with respect to the hands 226.

In some cases, the virtual positioning of the virtual keyboard 228 can be determined for the entire virtual keyboard as a single object. In some examples, the virtual keyboard 228 can be generated as different parts (e.g., as different virtual objects), and the different parts can be separately positioned with respect to the separate hands 226, or even to the different fingers, as described in more detail below with respect to FIG. 4. In such examples, as the hands and/or fingers move in space, the different parts of the virtual keyboard will move along with the different hands 226.

Figure 4:
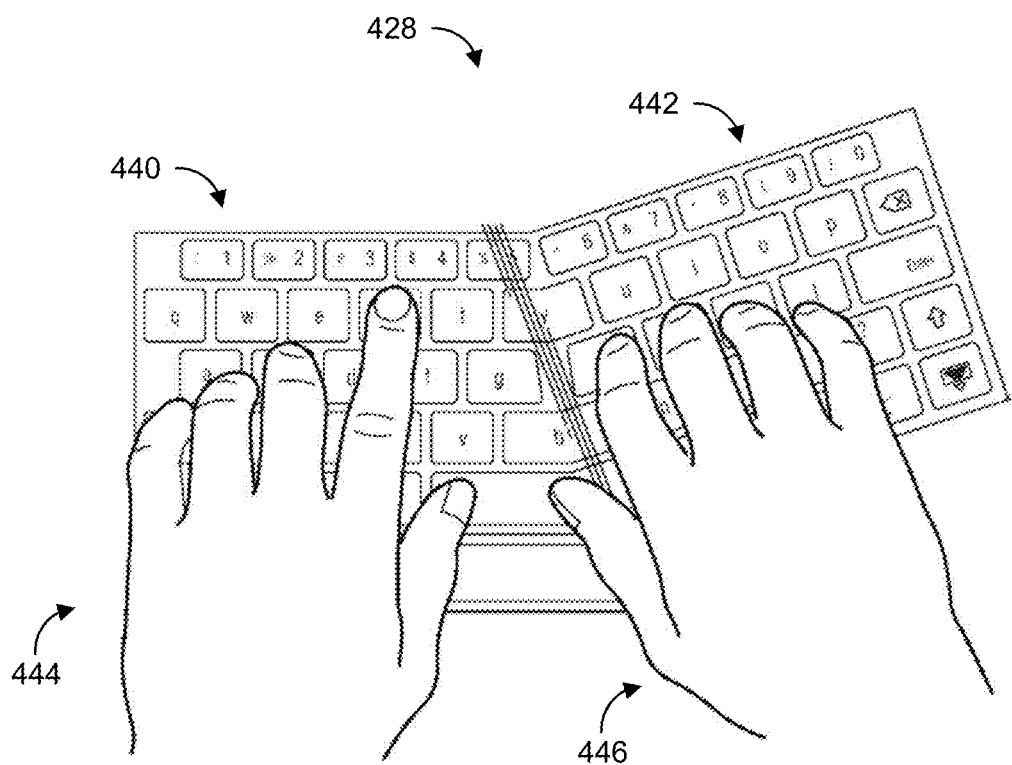
FIG. 4 is a diagram illustrating an example of a virtual keyboard split into two parts, in accordance with some examples.

In one illustrative example, the virtual keyboard 228 can be split into at least a first part and a second part. FIG. 4 is a diagram illustrating an example of a virtual keyboard 428 that has been split into two parts, including a first part 440 and a second part 442. The first part 440 of the virtual keyboard 428 can be registered relative to a first hand 444 of the user, and the second part 442 of the virtual keyboard 428 can be registered relative to a second hand 446 of the user, using registration techniques similar to those described above. The first part 440 can track the first hand 444, so that the first part 440 moves on the display of the AR device relative to the first hand 444 as the first hand 444 is moved by the user. The second part 442 of the virtual keyboard 428 can also move on the display relative to the second hand 446 as the second hand 446 is moved by the user.

By splitting the virtual keyboard 228 into multiple parts, such as that shown in FIG. 4, the accuracy of detecting which keyboard buttons are being pressed can be maximized. For example, certain buttons of each part of the virtual keyboard 228 can be registered to certain fingers (e.g., to landmarks points corresponding to the tips of certain fingers), so that the buttons are positioned next to (e.g., below or relative to) those fingers. In one illustrative example, the J, U, Y, H, N, M, and 7 buttons (and others in some cases) can be registered relative to the finger tip of the index finger of the right hand of the user or relative to other portion of the right hand. For instance, the portion of the virtual keyboard 228 including those buttons can be positioned (and/or move in some cases) relative to the finger tip of the index finger of the right hand of the user, so that those buttons are consistently in proximity to the tip of the index finger. In another example, the portion of the virtual keyboard 228 including those buttons can be positioned (and/or move in some cases) relative to another portion of the right hand or arm of the user, such as the wrist (e.g., center point on the wrist), palm (e.g., center point on the palm), or other portion or point on the hand or arm. In some examples, an initial position of each of the first part and the second part of the virtual keyboard 228 can be determined based on the location of the fingertips, wrist, palm, or other part of the hands 226 or arms of the user. In such examples, after the initial position of the virtual keyboard 228 is determined, the virtual keyboard 228 can move as the hands 226 of the user move. In some cases, as the hands 226 move, the virtual keyboard 228 can maintain the same location relative to the fingertip location(s), but may not move if the fingertips are within a threshold distance (e.g., 0.5 inch, 1 inch, 2 inches, and/or other distance) of selecting nearby keys. For instance, the virtual keyboard 228 can remain stationary when the fingertips are within the threshold distance of selecting nearby keys.

In some examples, other techniques can be performed to minimize key stroke errors by the user when using the virtual keyboard. For example, human errors can still occur, but accidental button presses as a result of the virtual keyboard placement or shape can be minimized. In some cases, segmentation of each finger can be performed to allow for precise target acquisition when the user uses a finger to press a button. Any suitable image segmentation can be performed to segment or partition the image into the different segments (e.g., sets of pixels, which can be referred to as super-pixels) corresponding to the different fingers. Examples of computer vision-based image segmentation techniques include a thresholding method, edge detection based techniques, region based techniques, clustering based techniques, watershed based techniques, partial differential equation based techniques, and machine learning (e.g., neural network) based techniques.

In some examples, the processor of the AR device 202 can determine the specific parts of the fingers (e.g. tip, nail, side, and/or other part), and can only accept input when a certain part of a finger is in contact with a part (e.g., a button) of the virtual keyboard 228. For example, using machine learning techniques (e.g., a neural network, such as a convolutional neural network or other machine learning system), the processor of the AR device 202 can determine which parts of a finger (e.g., all ten fingers) are acceptable to activate a button of the virtual keyboard 228. For instance, the tip of the finger can be an acceptable touch target activator for activating a button on the virtual keyboard 228, while the sides of a finger can be determined not to be an allowable touch target activator. The side of a finger can be defined as a part of the finger a certain distance from the center of the fingertip, such as two centimeters, three centimeters, or other distance. The processor of the AR device 202 can then determine which part of a finger is in contact with a button of the virtual keyboard 228, and can activate the button based on whether the part of the finger is an acceptable touch target activator. Using a machine learning model can allow many types (e.g., shapes, sizes, etc.) of fingers to work accurately with the virtual keyboard 228.

In some examples, the processor of the AR device 202 can detect a size of each finger (e.g., length and/or width) of a user. The processor of the AR device 202 can use the size information to better detect which buttons of the virtual keyboard 228 are intended to be selected by the user. In some examples, the processor of the AR device 202 can use the size information to determine a size of the virtual keyboard 228 and/or the size of the buttons of the virtual keyboard 228. For example, a larger virtual keyboard with larger buttons can be generated for a first user with large fingers, as compared to a second user with fingers that are smaller than the fingers of the first user.

In some examples, the sizing information can also be used to determine when a user is wearing gloves or other size altering items. For instance, gloves can cause the fingers to appear large, and can result in errors for fine manipulation and target selection when determining which buttons are intended to be selected by the user. In one illustrative example, in response to detecting the user's fingers are larger (or smaller) than a previously determined size, the processor of the AR device 202 can generate a larger (or smaller) virtual keyboard 228 with larger (or smaller) button sizes. In one illustrative example, in response to detecting the user's fingers are larger (or smaller) than a previously determined size, the processor of the AR device 202 can virtually change the sizing of the altered hands (e.g., based on the user wearing gloves) to match the previously determined size (e.g., non-gloved hands).

In some examples, the processor of the AR device 202 can track a user's typing habits (e.g., where they hit specific keys, where errors occur, among others). Using the tracked typing habits, the AR device 202 can customize the layout of the virtual keyboard 228 to accommodate the user's typing habits. For example, certain buttons can be slightly moved to reduce typing errors, certain buttons can be resized, and/or other modifications can be performed. In some examples, machine learning can be used track the user's typing habits.

Figure 5:
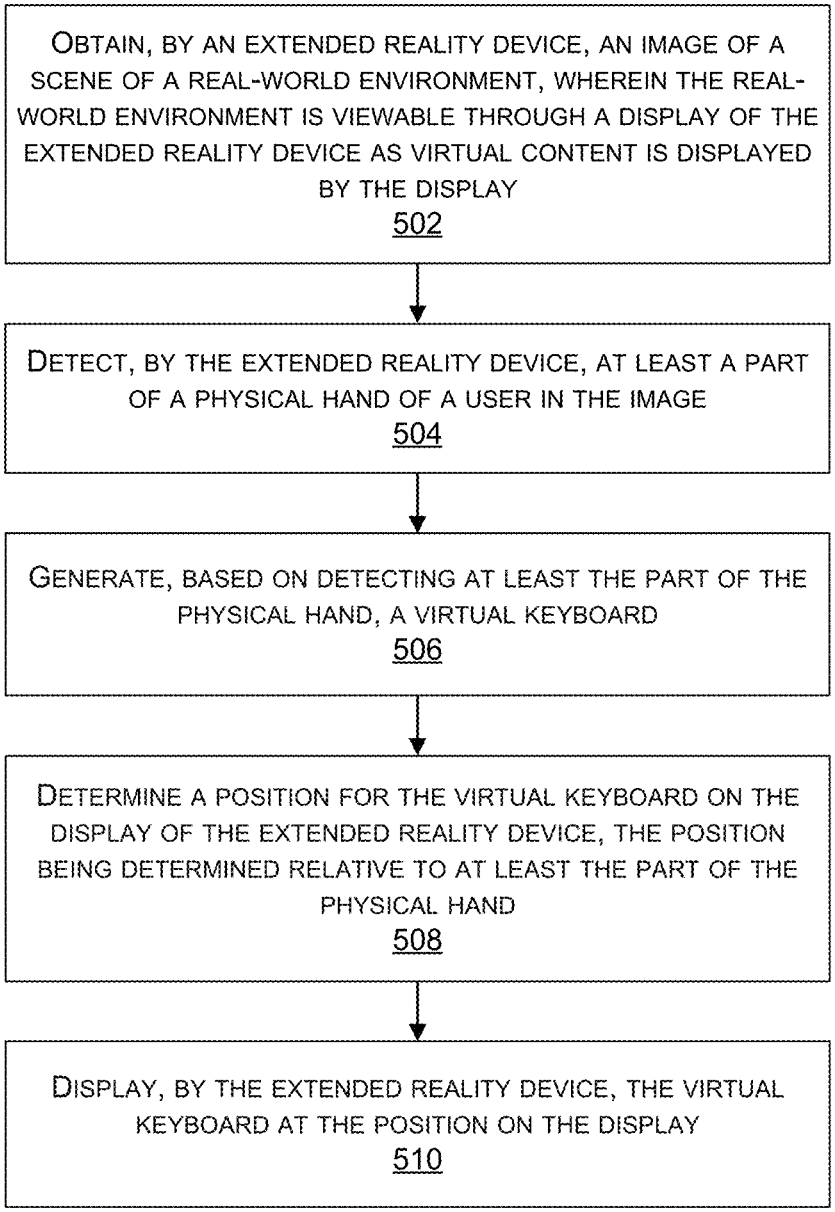
FIG. 5 is a flow diagram illustrating an example of a process for displaying virtual content, in accordance with some examples.

FIG. 5 is a flowchart illustrating an example of a process 500 for generating virtual content. At block 502, the process 500 includes obtaining, by an extended reality device, an image of a scene of a real-world environment. The extended reality device can include a display that allows the real-world environment to be viewable through the display as virtual content is displayed by the display. The extended reality device can include an augmented reality (AR) device (e.g., an AR headset such as an HMD, AR glasses, or other AR device), a virtual reality (VR) headset (e.g., an HMD or other type of VR headset), or a mixed reality (MR) device. In some examples, the process 500 can be performed by the extended reality device or a component of the extended reality device.

At block 504, the process 500 includes detecting, by the extended reality device, at least a part of a physical hand of a user in the image. In some examples, at least the part of the physical hand is viewable through the display of the extended reality device (e.g., as part of the real-world environment). In some cases, at least the part of the physical hand includes at least one point on the hand and at least one point on a finger of the hand. For instance, at least the part of the hand that is detected can include any of the points of a hand illustrated in FIG. 3. In some examples, at least the part of the hand includes at least one point on the hand and at least one point on each finger of the hand. For instance, referring to FIG. 3, at least the part of the hand that is detected can include the landmark point 335 in the palm of the hand 326 and at least one of the landmark points on each finger of the hand 326.

At block 506, the process 500 includes generating, based on detecting at least the part of the physical hand, a virtual keyboard. At block 508, the process 500 includes determining a position for the virtual keyboard on the display of the extended reality device relative to the physical hand. In some examples, the process 500 can include detecting one or more landmark points on the physical hand. The process 500 can include determining one or more locations of the one or more landmark points with respect to a camera used to capture the image. The process 500 can also include determining the position for the virtual keyboard on the display relative to the physical hand. The position for the virtual keyboard can be determined based on the one or more locations of the one or more landmark points with respect to the camera. For example, the virtual keyboard can be registered relative to the one or more locations of the one or more landmark points.

In some examples, the pose of a head of the user can be used to register the virtual keyboard. For instance, the process 500 can include determining a pose of a head of the user, and determining, based on the pose of the head, the position for the virtual keyboard on the display relative to the head.

At block 510, the process 500 includes displaying, by the extended reality device, the virtual keyboard at the position on the display. For instance, in some cases, the process 500 can display the virtual keyboard at the position on the display over the real-world environment that is viewable through the display. In some implementations, the virtual keyboard is displayed as an overlay at the position in an additional image of the scene. In some implementations, the virtual keyboard is displayed as a projection at the position on the display.

In some examples, the virtual keyboard is fixed at the position on the display as the physical hand moves positions. In some cases, the process 500 can include receiving input associated with operation of the virtual keyboard, and maintaining the virtual keyboard at the position as the virtual keyboard is operated based on the received input. For example, in such cases, the virtual keyboard remains fixed in the position on the display (the position at which it was registered) as a user types or otherwise operates the virtual keyboard.

In some cases, the process 500 can include determining at least the part of the physical hand is in a different location in an additional image of the scene as compared to a location of at least the part of the physical hand in the image. Based on determining at least the part of the physical hand is in the different location in the additional image of the scene, the process 500 can include displaying the virtual keyboard at an additional position on the display, where the additional position is different than the position.

In some cases, the process 500 can include detecting expiration of a predetermined amount of time after determining the position for the virtual keyboard on the display. Based on detecting expiration of the predetermined amount of time, the process 500 can include displaying virtual keyboard at an additional position on the display, where the additional position is different than the position.

In some examples, the virtual keyboard includes a first part and a second part. For example, the process 500 can include generating the virtual keyboard so that it has the first part and the second part. In some instances, the first part can be displayed at the position on the display relative to the physical hand, and the second part can be displayed at an additional position on the display relative to an additional physical hand of the user. In some cases, the first part of the virtual keyboard moves on the display relative to the physical hand (e.g., as the hand moves), and the second part of the virtual keyboard moves on the display relative to the additional physical hand (e.g., as the additional hand moves).

In some examples, the process 500 can include determining the physical hand is not present in an additional image of the scene, and removing the virtual keyboard from the display based on determining the physical hand is not present in the additional image of the scene. In some examples, the virtual keyboard is active for providing input when the virtual keyboard is removed from the display.

In some examples, the process 500 includes deactivating the virtual keyboard from being used for providing input. In some cases, the process 500 deactivates the virtual keyboard in response to determining the physical hand is not present one or more images of the scene. In some examples, the process 500 deactivates the virtual keyboard in response to receiving user input indicating deactivation of the virtual keyboard.

In some examples, the virtual keyboard is displayed when the physical hand is not present in one or more images of the scene. For instance, the process 500 can display the virtual keyboard in a pre-defined location on the display when the hands are not detected in one or more images. In some cases, the particular or pre-defined location can be configured or set by the user.

The examples described above with respect to the process 500 and with respect to FIG. 1-FIG. 4 can be implemented individually or in any combination.

Figure 6:
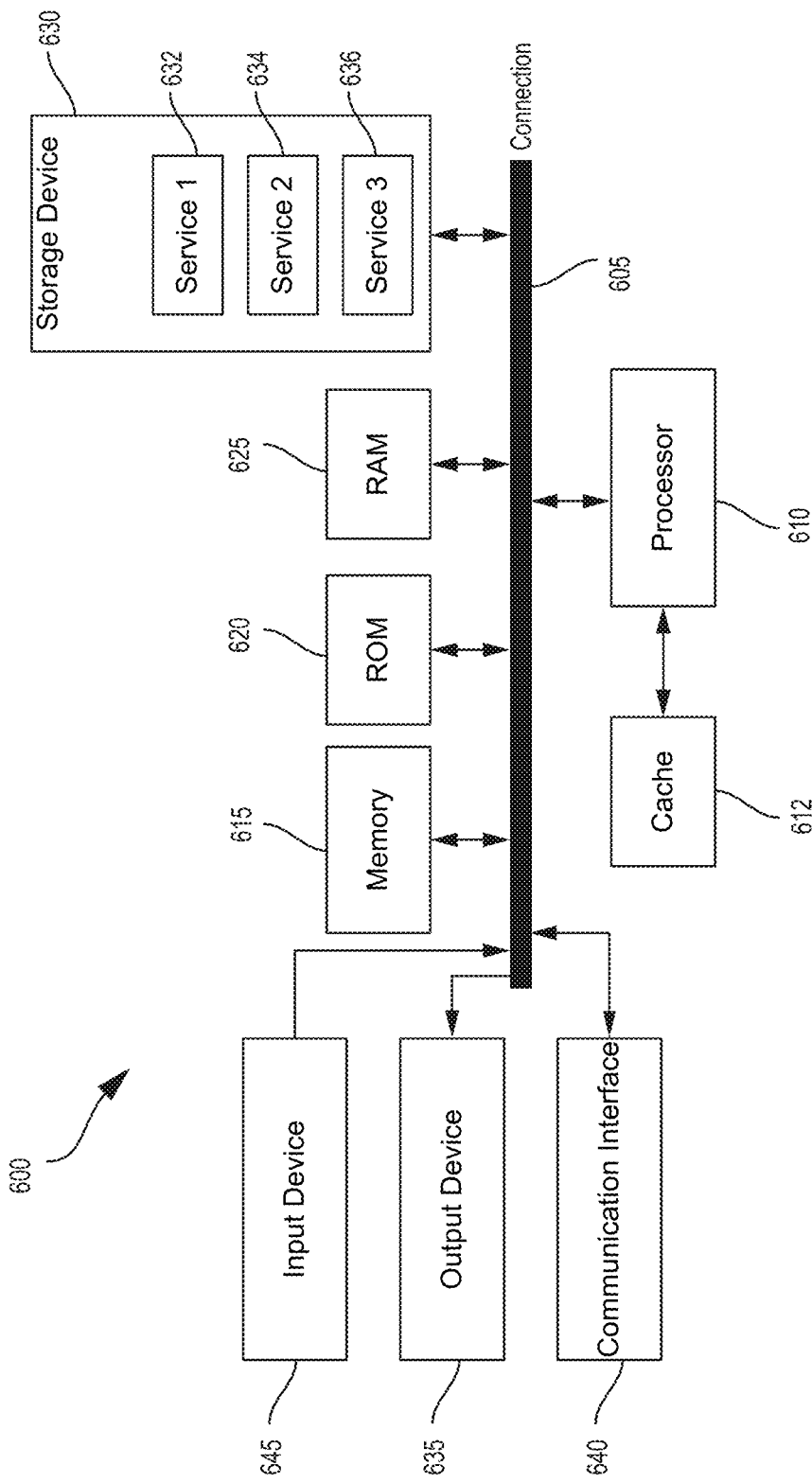
FIG. 6 is an example computing device architecture of an example computing device that can implement the various techniques described herein.

In some examples, the process 500 may be performed by a computing device or apparatus, such as a computing device having the computing device architecture 600 shown in FIG. 6. In one illustrative example, the computing device (e.g., performing the process 500) can include an extended reality display device, such as AR glasses, an AR head mounted display (HMD), a VR HMD, an MR HMD, or other type of XR device.

In some cases, the computing device or apparatus may include an input device, an output device, one or more processors, one or more microprocessors, one or more microcomputers, and/or other component(s) that is/are configured to carry out the steps of process 500. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 500 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 6 is a diagram illustrating an example of a system for implementing certain aspects of the present technology. In particular, FIG. 6 illustrates an example of computing system 600, which can be for example any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1. A method of generating virtual content, the method comprising: obtaining, by an extended reality device, an image of a scene of a real-world environment, wherein the real-world environment is viewable through a display of the extended reality device as virtual content is displayed by the display; detecting, by the extended reality device, at least a part of a physical hand of a user in the image; generating, based on detecting at least the part of the physical hand, a virtual keyboard; determining a position for the virtual keyboard on the display of the extended reality device, the position being determined relative to at least the part of the physical hand; and displaying, by the extended reality device, the virtual keyboard at the position on the display.

Example 2. The method of example 1, further comprising: detecting one or more landmark points on the physical hand; determining one or more locations of the one or more landmark points with respect to a camera used to capture the image; and determining, based on the one or more locations of the one or more landmark points with respect to the camera, the position for the virtual keyboard on the display relative to the physical hand.

Example 3. The method any one of examples 1 or 2, further comprising: determining a pose of a head of the user; and determining, based on the pose of the head, the position for the virtual keyboard on the display relative to the head.

Example 4. The method of any one of examples 1 to 3, wherein the virtual keyboard is fixed at the position on the display as the physical hand moves positions.

Example 5. The method of any one of examples 1 to 4, further comprising: receiving input associated with operation of the virtual keyboard; and maintaining the virtual keyboard at the position as the virtual keyboard is operated based on the received input.

Example 6. The method of any one of examples 1 to 5, further comprising: determining at least the part of the physical hand is in a different location in an additional image of the scene as compared to a location of at least the part of the physical hand in the image; and displaying, based on determining at least the part of the physical hand is in the different location in the additional image of the scene, the virtual keyboard at an additional position on the display, the additional position being different than the position.

Example 7. The method of any one of examples 1 to 6, further comprising: detecting expiration of a predetermined amount of time after determining the position for the virtual keyboard on the display; and displaying, based on detecting expiration of the predetermined amount of time, the virtual keyboard at an additional position on the display, the additional position being different than the position.

Example 8. The method of any one of examples 1 to 7, wherein at least the part of the physical hand includes at least one point on the physical hand and at least one point on a finger of the physical hand.

Example 9. The method of any one of examples 1 to 8, wherein at least the part of the physical hand includes at least one point on the physical hand and at least one point on each finger of the physical hand.

Example 10. The method of any one of examples 1 to 9, wherein the virtual keyboard includes a first part and a second part, the first part being displayed at the position on the display relative to the physical hand, and the second part being displayed at an additional position on the display relative to an additional physical hand of the user.

Example 11. The method of example 10, wherein the first part of the virtual keyboard moves on the display relative to the physical hand, and wherein the second part of the virtual keyboard moves on the display relative to the additional physical hand.

Example 12. The method of any one of examples 1 to 11, further comprising: determining the physical hand is not present in an additional image of the scene; and removing, based on determining the physical hand is not present in the additional image of the scene, the virtual keyboard from the display.

Example 13. The method of any one of examples 1 to 12, wherein the virtual keyboard is active for providing input when the virtual keyboard is removed from the display.

Example 14. The method of any one of examples 1 to 13, further comprising deactivating the virtual keyboard from being used for providing input.

Example 15. The method of any one of examples 1 to 14, wherein the virtual keyboard is displayed when the physical hand is not present in one or more images of the scene.

Example 16. An apparatus comprising a memory configured to store one or more images and a processor configured to perform operations according to any of examples 1 to 15.

Example 17. The apparatus of example 16, wherein the apparatus comprises an extended reality device.

Example 18. The apparatus of any one of examples 16 or 17, further comprising a camera configured to capture the image of the scene.

Example 19. The apparatus of any one of examples 16 to 18, further comprising a display configured to display one or more images of the scene.

Example 20. A computer readable medium having stored thereon instructions that when executed by a processor perform operations according to any of examples 1 to 15.

Example 21. An apparatus comprising one or more means for performing operations according to any of examples 1 to 15.

What is claimed is:

1. An apparatus for generating virtual content, the apparatus comprising:
at least one memory; and
at least one processor configured in circuitry and coupled to the at least one memory, the at least one processor being configured to:
obtain an image of a scene of a real-world environment, wherein the real-world environment viewable through a display of the apparatus as virtual content is displayed by the display;
detect at least a pose of a hand of a user in the image;
generate, in response to detecting at least the pose of the hand, a graphical user interface (GUI) element;

determine a position for the GUI element on the display of the apparatus, the position being determined relative to at least the pose of the hand; and display the GUI element at the position on the display.

2. The apparatus of claim 1, wherein the position of the GUI element is adjustable by the user.

3. The apparatus of claim 1, wherein the at least one processor is configured to:

detect one or more landmark points on the hand;

determine one or more locations of the one or more landmark points with respect to a camera used to capture the image; and determine, based on the one or more locations of the one or more landmark points with respect to the camera, the position for the GUI element on the display relative to the hand.

4. The apparatus of claim 1, wherein the at least one processor is configured to:

determine a pose of a head of the user; and determine, based on the pose of the head, the position for the GUI element on the display relative to the head.

5. The apparatus of claim 1, wherein the GUI element is fixed at the position on the display as the hand moves positions.

6. The apparatus of claim 1, wherein the at least one processor is configured to:

receive input associated with operation of the GUI element; and maintain the GUI element at the position as the GUI element is operated based on the received input.

7. The apparatus of claim 1, wherein the at least one processor is configured to:

determine at least the pose of the hand is in a different location in an additional image of the scene as compared to a location of at least the pose of the hand in the image; and display, based on determining at least the pose of the hand is in the different location in the additional image of the scene, the GUI element at an additional position on the display, the additional position being different than the position.

8. The apparatus of claim 1, wherein the at least one processor is configured to:

detect expiration of a predetermined amount of time after determining the position for the GUI element on the display; and display, based on detecting expiration of the predetermined amount of time, the GUI element at an additional position on the display, the additional position being different than the position.

9. The apparatus of claim 1, wherein at least the pose of the hand includes at least one point on the hand and at least one point on a finger of the hand.

10. The apparatus of claim 1, wherein at least the pose of the hand includes at least one point on the hand and at least one point on each finger of the hand.

11. The apparatus of claim 1, wherein the GUI element includes a first part and a second part, the first part being displayed at the position on the display relative to the hand, and the second part being displayed at an additional position on the display relative to an additional hand of the user.

12. The apparatus of claim 11, wherein the first part of the GUI element moves on the display relative to the hand, and wherein the second part of the GUI element moves on the display relative to the additional hand.

13. The apparatus of claim 1, wherein the at least one processor is configured to:

determine the hand is not present in an additional image of the scene; and remove, based on determining the hand is not present in the additional image of the scene, the GUI element from the display.

14. The apparatus of claim 13, wherein the GUI element is active for providing input when the GUI element is removed from the display.

15. The apparatus of claim 14, wherein the at least one processor is configured to deactivate the GUI element from being used for providing input.

16. The apparatus of claim 1, wherein the at least one processor is configured to display the GUI element when the hand is not present in one or more images of the scene.

17. The apparatus of claim 1, wherein the apparatus comprises an extended reality device including a display and at least one camera configured to capture one or more images of the scene.

18. A method of generating virtual content, the method comprising:

obtaining, by an extended reality device, an image of a scene of a real-world environment, wherein the real-world environment viewable through a display of the extended reality device as virtual content is displayed by the display;

detecting, by the extended reality device, at least a pose of a hand of a user in the image;

generating, in response to detecting at least the pose of the hand, a graphical user interface (GUI) element;

determining a position for the GUI element on the display of the extended reality device, the position being determined relative to at least the pose of the hand; and displaying, by the extended reality device, the GUI element at the position on the display.

19. The method of claim 18, wherein the position of the GUI element is adjustable by the user.

20. The method of claim 18, further comprising:

detecting one or more landmark points on the hand;

determining one or more locations of the one or more landmark points with respect to a camera used to capture the image; and determining, based on the one or more locations of the one or more landmark points with respect to the camera, the position for the GUI element on the display relative to the hand.

* * * * *